(No Model.)

J. B. NEWSOM.
COMBINED PLANTER AND CULTIVATOR.

No. 283,272. Patented Aug. 14, 1883.

WITNESSES:
Thos. Houghton.
A. G. Syne.

INVENTOR:
J. B. Newsom
BY Munn
ATTORNEYS.

United States Patent Office.

JOHN B. NEWSOM, OF NEAR EUFAULA, ASSIGNOR OF ONE-HALF TO EBENEZER PRIEST, OF EUFAULA, ALABAMA.

COMBINED PLANTER AND CULTIVATOR.

SPECIFICATION forming part of Letters Patent No. 283,272, dated August 14, 1883.

Application filed February 21, 1883. (No model.)

*To all whom it may concern:*

Be it known that I, JOHN BUCHANAN NEWSOM, of the county of Dale, near Eufaula, in the State of Alabama, have invented a new and useful Improvement in Combined Planter and Cultivator, of which the following is a full, clear, and exact description, reference being had to the annexed drawings, forming part of this specification.

This invention relates to cotton planters and cultivators; and the invention consists of the novel construction hereinafter described and claimed.

Figure 1:
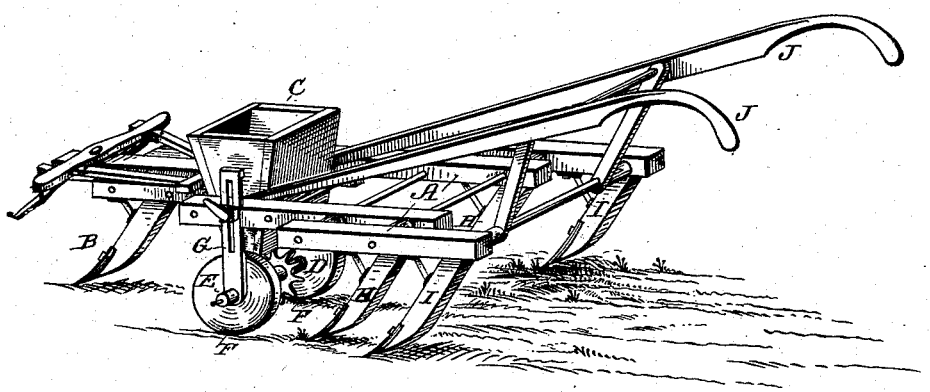
Figure 2:
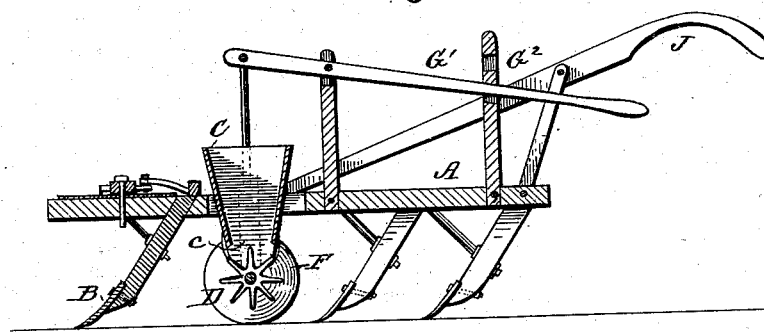
Figure 3:
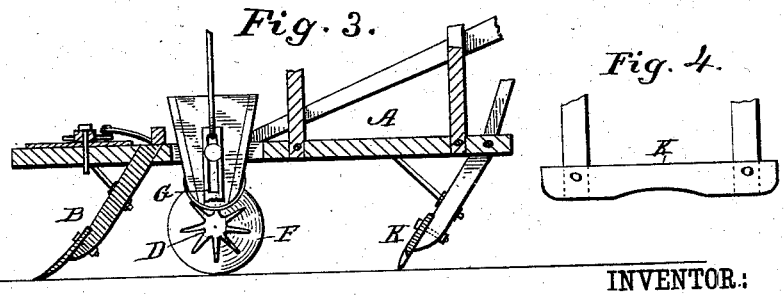
Figure 4:
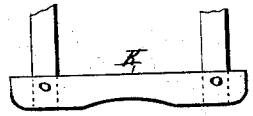

In the drawings, Figure 1 is a perspective view of the combined planter and cultivator. Fig. 2 is a sectional view showing a modification. Fig. 3 is a sectional view showing a modification, and Fig. 4 is a detail view.

A indicates the frame-work of the implement, and B is an opening-plow arranged at its forward end. Behind the plow B is a hopper, C, having a slot, c, in its bottom, in which the star-shaped wheel D is fitted to revolve to distribute the seeds in the furrow. The wheel D is mounted on an axle, E, to the ends of which are rigidly secured the driving-wheels F F, which are adapted to rest in contact with the ground and to receive their rotation from the movement of the planter. The axle E is supported in slotted standards G, which are adjustably secured to the frame by bolts passing through the slots, in order that the wheels F may be raised or lowered to suit the depth of the plowing or to support the plows above ground.

Instead of adjusting the standards G by means of bolts, they may be connected together by a cross-bar and provided with a lever, G', which is connected to said cross-bar, and adapted to be held at its free end by a suitable catch or locking device, G², mounted upon the planter, near the rear thereof. By this means, in turning round at the ends of rows, the wheels may be elevated above ground by simply adjusting the lever to prevent operating the dropping device, and thereby to save the grain which would be wasted by the continuous rotation of the wheels.

It is designed that the slot c in the bottom of the hopper shall be adjustable in size to regulate the quantity of seeds planted.

At the rear of the hopper are two plows, H H, arranged side by side, to adapt them to cover the furrow in which the seeds have been dropped, and still farther to the rear are the two plows I I, arranged outside the lines of the plows H H.

The cotton planter and cultivator is provided with a pair of handles, J, in the manner of a plow.

K indicates a covering-board, which may be used, instead of the plows H H, to cover cotton-seeds. The board is recessed at the center of one edge, to throw the soil to a central line directly over the furrow.

The beams of the plows I I are so attached that they may be easily removed to lighten the draft sufficiently for one horse. By removing the forward plow and the hopper the device is converted into a cultivator, or is adapted for breaking up and bedding the soil preparatory to planting. As the several parts are to be removable, the implement may be easily adapted for different uses, at the will of the operator, whether for planting cotton or other seeds, or distributing guano or reducing the stand of cotton, as well as the uses above named.

Having thus described my invention, what I claim, and desire to secure by Letters Patent, is—

The combination of the frame A, having the opening and covering plows, the hopper C, having slot c, the star-shaped wheel D, axle E, wheels F, slotted standards G, connected by a cross-bar, and the lever and catch for adjusting the said standards, substantially as shown and described, and for the purpose set forth.

JOHN B. $\overset{\text{his}}{\times}$ NEWSOM.
<span style="margin-left:2em">mark.</span>

Witnesses:
A. H. MERRILL,
N. C. VAUGHAN.